United States Patent [19]
Stief et al.

[11] Patent Number: 5,473,125
[45] Date of Patent: Dec. 5, 1995

[54] VIBRATION-INSULATING PANEL ELEMENT

[75] Inventors: Reinhard Stief, Weinheim; Christoph Müller; Roger Schork, both of Mörlenbach; Gerhard Müller-Broll, Rimbach; Thomas Jost, Weinheim; Klaus Bickel, Fürth; Jürgen Carocci, Schriesheim, all of Germany

[73] Assignee: Firma Carl Freudenberg, Weinheim, Germany

[21] Appl. No.: 268,220

[22] Filed: Jun. 29, 1994

[30] Foreign Application Priority Data

Jun. 29, 1993 [DE] Germany .................. 43 21 551.3

[51] Int. Cl.⁶ .................................. E04B 1/82
[52] U.S. Cl. ............................ 181/290; 181/286
[58] Field of Search ..................... 181/287, 288, 181/290, 286, 207, 208; 428/133, 542.8, 31

[56] References Cited

U.S. PATENT DOCUMENTS

| | | | |
|---|---|---|---|
| 4,456,092 | 6/1984 | Kubozuka et al. | 181/290 |
| 4,867,271 | 9/1989 | Tschudin-Mahrer | 181/290 |
| 4,904,511 | 2/1990 | Barberis | 428/133 |

*Primary Examiner*—Khanh Dang
*Attorney, Agent, or Firm*—Kenyon & Kenyon

[57] ABSTRACT

A panel element for insulating acoustically undesirable vibrations is disclosed. The panel element comprises a closed-cell foam element for closing off a hollow body provided with an opening on at least one side. The foam element possesses a mounting structure by which it can be fastened to the hollow body. The foam element is configured to the shape of the opening, and has on its perimeter a mounting structure. The mounting structure consists of a self-contained peripheral groove open in the direction of the boundary. The groove and the boundary can be brought into engagement with one another in a sealing and positive manner.

12 Claims, 2 Drawing Sheets

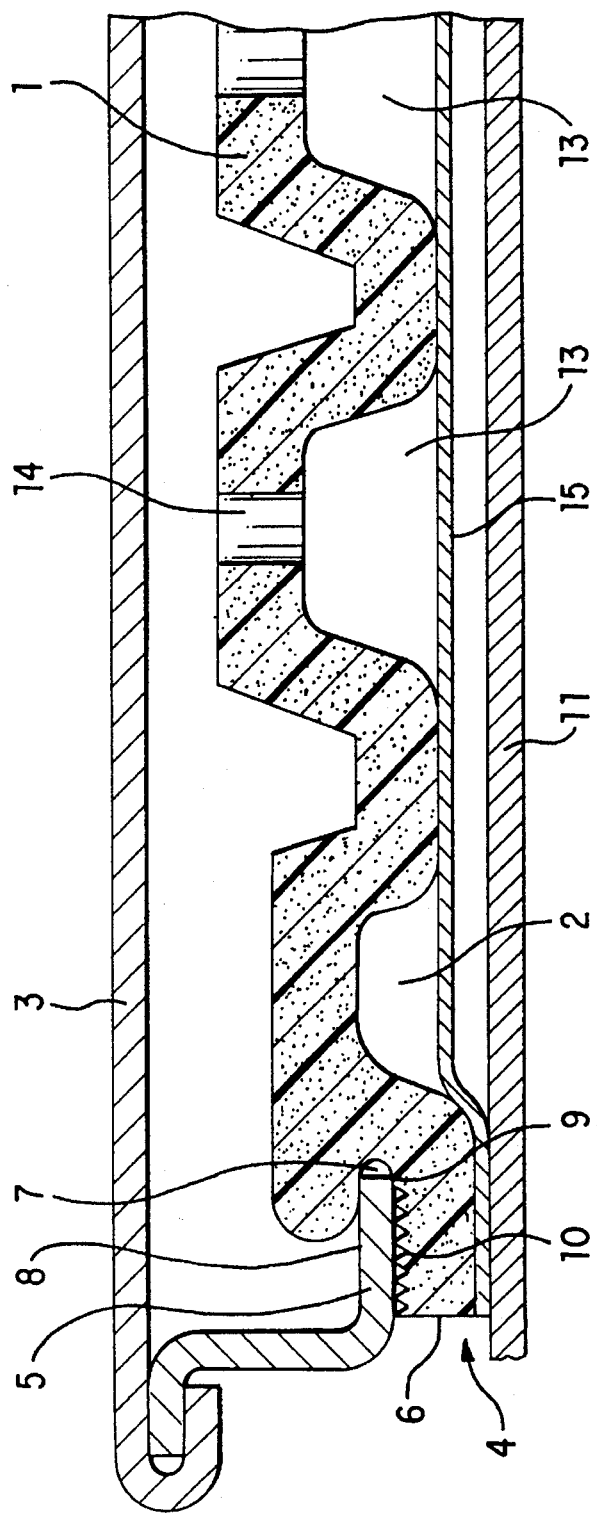
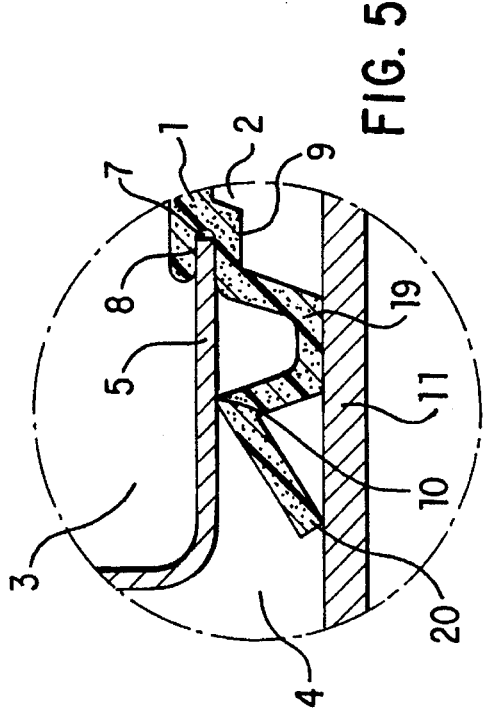
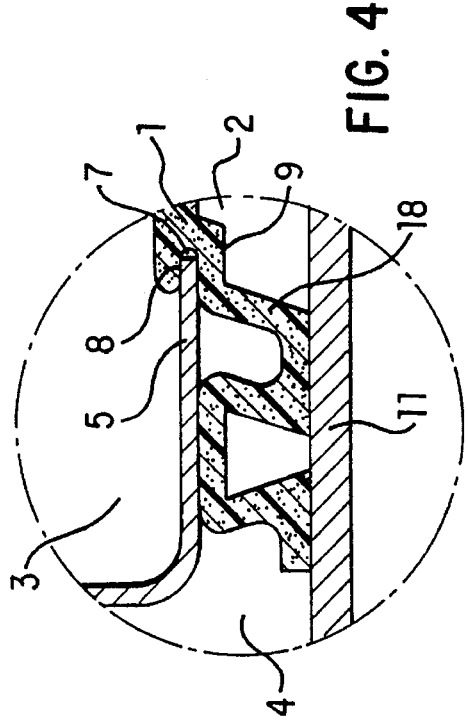

[5,473,125](5,473,125)

VIBRATION-INSULATING PANEL ELEMENT

BACKGROUND OF THE INVENTION

The present invention relates generally to a panel element for insulating against unwanted acoustical vibrations. More particularly, the subject of the invention is a closed-cell foam element for closing off a hollow body that has an opening on at least one side, in which the foam element has a mounting structure by which it can be fastened to the hollow body.

A panel element of this kind is described in European Patent Application EP-A-0 290 399 (this corresponds to U.S. Pat. No. 4,904,511, the contents of which are incorporated by reference herein). It consists of a multi-part door panel for motor vehicles that have recesses in which the foam element can be mounted within the panel. Mounting is accomplished with pins that are integrally formed onto the side of the panel facing away from the interior and which positively penetrate correspondingly arranged openings of the foam element. However, the capability of this device to insulate against acoustically troublesome vibrations is less than satisfactory due to the size and arrangement of the foam elements.

This invention is directed towards the further development of a panel element of the aforementioned general type in a way that provides better insulation against acoustically unwanted vibrations, and that obviates the need to separately seal the opening of the hollow body with respect to the environment. It is further desirable that the panel element concomitantly protect against both wind and moisture.

SUMMARY OF THE INVENTION

The invention provides for a panel element for sealing off the opening of a hollow body, such as the opening of a motor vehicle door. The panel element is foam, which can be made of a number of materials, including polyethylene or polypropylene. It is shaped to generally match the shape of the opening into which it is to be placed and has a mounting structure on its periphery facing the boundary of the opening to which it is fitted. The mounting structure consists of a self-contained peripheral groove along the edge of the foam element that is open in the direction of the boundary opening. The groove and the boundary of the opening into which it is filled can be sealingly brought into engagement with one another in a positive manner. The interior opening of the hollow body is then advantageously completely closed off by the foam element, with the result that the foam element effectively blocks out unwanted noise. This is especially useful when the hollow body is a motor vehicle door, as no separate sealing with respect to the interior panel is required. Previously, sealing of this kind was usually achieved by means of films that were provided with an adhesive surface surrounding the opening. In addition to being cumbersome to handle, the adhesive surface was covered with a carrier paper or carrier film that had to be removed immediately before installation. This system created large quantities of waste. Moreover, once installed, further alignment of this known film proved to be impossible. By contrast, the self-contained groove, which can be brought into engagement with the opening boundary in a sealing and positive manner, creates a reliable seal against the elements, such as splashed or condensed water. Furthermore, the invention permits the relatively easy fitting of the panel element to the hollow body, with alignment possible at any time subsequent to assembly. A further advantage is that the panel element can be disassembled from the hollow body without damage, so that the panel element can be used repeatedly without additional extensive reprocessing costs.

In one embodiment, the groove formed along the peripheral edge of the foam panel has a substantially U-shaped profile, with at least one of its mutually facing delimiting surfaces possessing at least one sealing lip which sealingly surrounds the opening of the hollow body. This configuration provides increased security against the penetration of moisture between the hollow body and the interior panel. A configuration of this kind is advantageous when moisture is not desired on the side of the environment facing away from the hollow body. For example, if the panel element is utilized in a motor vehicle door, assurance must be provided that any water which might leak past the windows into the door, as well as splashed water that may penetrate from below into the door, be reliably kept away from the interior panel to prevent damage.

The foam element can be joined on the side facing away from the hollow body to a component of an interior panel of a vehicle, which may be part of a door panel. Because of the fluid-tight connection between the foam element and the opening of the hollow body, even materials with little moisture resistance can then be utilized as door panels. For example, a shaped element made of consolidated nonwoven cotton fiber could be used. The sealing joint between the foam element and the boundary prevents the shaped element from being affected by moisture from within the cavity. Since the groove of the foam element sealingly surrounds the boundary of the cavity with elastic preload, a good seal is assured over a long service life.

The foam element and the interior panel can form a preassembled unit and can be snapped in together into the hollow body, thereby simplifying handling and assembly. The foam element is snapped into the opening of the hollow body by flexibly deforming the external peripheral side of the panel in which the groove is arranged. The foam element can be chamfered in its rim region so that it can first be placed into the opening of the hollow body so that preliminary positioning can be made, and then moved toward the hollow body until its groove snaps into the boundary of the opening. The foam element and the interior panel can also be disassembled as a unit, as may be necessary when affecting repairs on or inside the vehicle door.

The foam element and the interior panel can be arranged in a generally parallel, spaced apart configuration, by providing the foam element with integrally shaped-on spacers that contact the interior panel under an elastic preload. The interior panel can bridge large opening cross sections without losing its shape.

The spacers can be cup-shaped to form Helmholz resonators. In this embodiment, adjacent Helmholz resonators enclose differing volumes and similarly have differently sized orifices. This advantageously permits the absorption of airborne sound of various frequencies. There are many useful ways of employing such resonators. For example, the Helmholz resonators can be arranged non-overlappingly in the region of the opening, identical Helmholz resonators being associated adjacent to one another at a distance, and different resonators being configured between them. Consequently, the effective radii of the identical resonators do not overlap, thereby producing good sound absorption. In this embodiment, a film is adhesively bonded to the foam element on the side of the foam element facing the interior panel. This film bounds the Helmholz resonators in the side facing away from the orifices. The film is provided in order to keep any moisture that may penetrate through the orifices of the Helmholz resonators away from the interior panel.

BRIEF DESCRIPTION OF THE FIGURES

The invention will now be described in detail with reference to the appended drawings, provided purely by way of non-limiting examples, in which:

FIG. 3 shows a third exemplary embodiment, in which the foam element is provided with Helmholz resonators, and is covered with a watertight film on the side facing the interior panel; and FIGS. 4 and 5 each show additional exemplary embodiments that differ from the panel element of FIG. 1 in their mounting structure.

DETAILED DESCRIPTION

Figure 1:
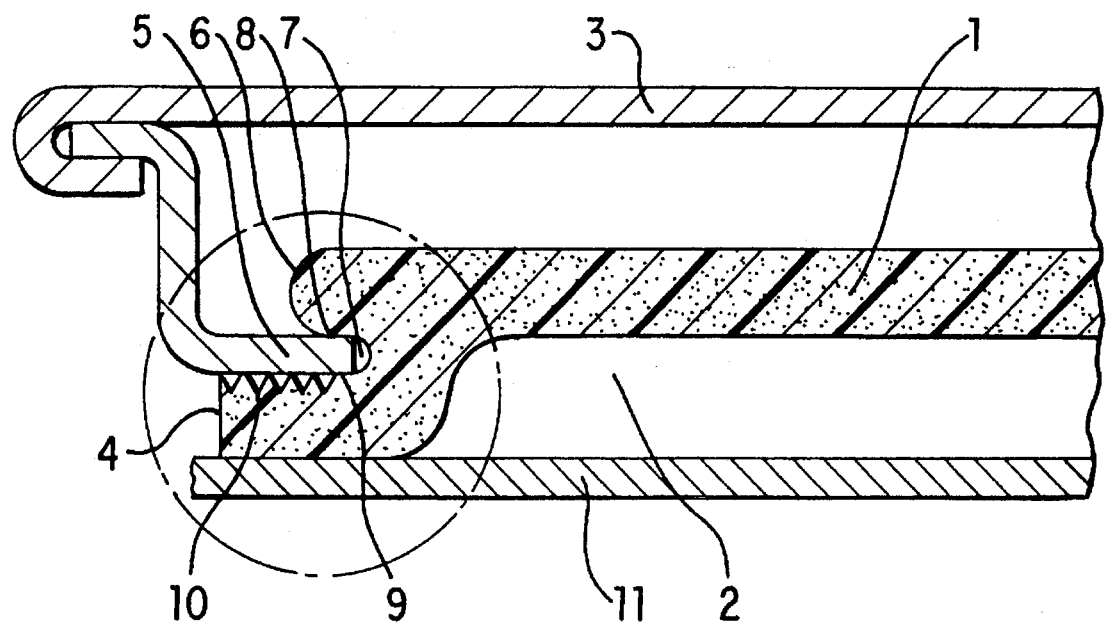
FIG. 1 is a sectional view of a boundary portion of a first embodiment of the panel element according to the invention, in which the panel element is mounted onto a motor vehicle door.
Figure 2:
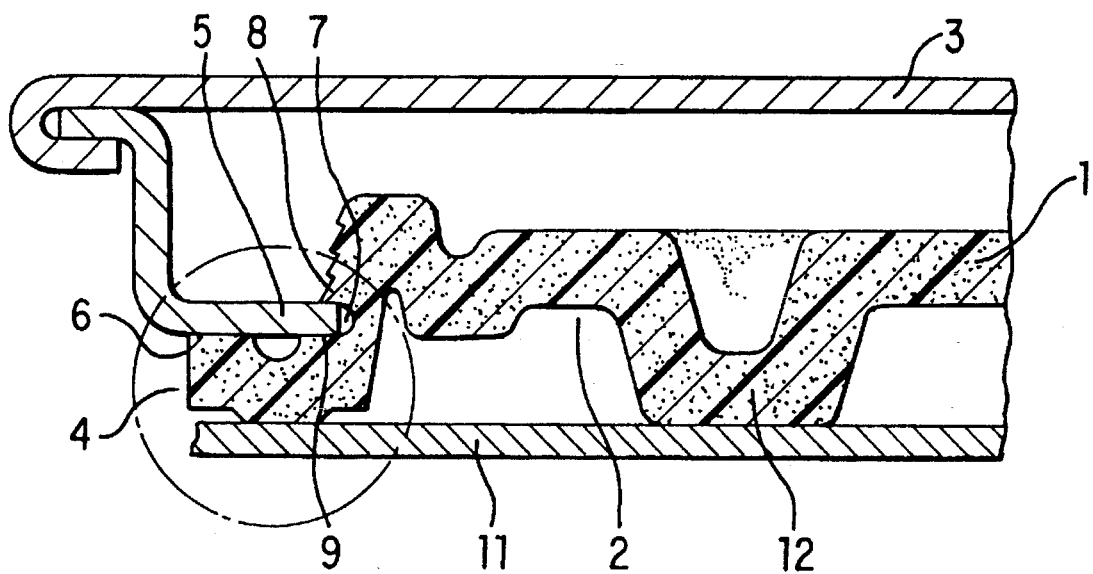
FIG. 2 is a partial sectional view of a second embodiment of the panel that can be snapped into the opening of the door, the foam element being supported on the interior panel of the door with a spacer.

FIGS. 1 to 3 each show an exemplary embodiment of a panel element constructed according to the principles of the invention. In these embodiments, a foam element 1 is mounted in the opening 2 of a hollow body 3 that, in this particular application, lies within a vehicle door. Opening 2 of the vehicle door, arranged in the direction of the interior, is enclosed by a peripheral boundary 5 that is engaged in a positive and sealing manner with a mounting structure, configured as groove 7, of the foam element 1. Groove 7 is arranged along the peripheral edge 6 of foam element 1 and possesses a substantially U-shaped profile. To simplify assembly, delimiting surface 8 of the groove, arranged inside opening 2, is shorter than delimiting surface 9 arranged in the direction of interior panel 11. Groove 7 encloses and contacts boundary 5 under an elastic preload; delimiting surface 9 of groove 7 is provided with a plurality of adjacent sealing lips 10.

In FIG. 1, the adjacent sealing lips 10 provide a reliable seal of opening 2 with respect to interior panel 11. This structure effectively prevents acoustically troublesome vibrations from reaching the inside of the door via the body (such vibrations are usually caused by vibrations arising in the wheels, the engine, or by wind motion).

FIG. 2 shows a second embodiment that differs from the embodiment of FIG. 1 in its mounting structure. Foam element 1 is designed to snap into opening 2, the surface of foam element 1 being provided, on the side facing boundary 5, with barbed projections for this purpose. In this embodiment, the foam element is supported in planar fashion on boundary 5 of the hollow body 3. In addition, foam element 1 contacts interior panel 11 with cup-shaped projections that are configured as spacers 12. This configuration assures a consistent relative spacing among hollow body 3, foam element 1, and interior panel 11 relative to one another, thus producing consistent operating characteristics over the service life of the panel.

FIG. 3 illustrates a third embodiment in which the mounting structure 4 is substantially similar to that of FIG. 1. Similar to FIG. 2, the foam element is provided with cup-shaped projections. In order to improve sound absorption, these are configured as Helmholz resonators. The volume 13 enclosed by each of the adjacent Helmholz resonators is different in each case, as is the opening cross section of the orifices 14. Because of this configuration, acoustic vibrations of varying frequencies can be absorbed. Foam element 1 is adhesively joined, on the side facing interior panel 11, to an integrally formed-on film 15. This configuration ensures that interior panel 11 is protected against moisture located inside hollow body 3.

FIGS. 4 and 5 show two further examples of a mounting structure 4, which can be utilized in place of the mounting structure shown previously in FIGS. 1 to 3. In FIG. 4, foam element 1 is arranged with a dovetail-shaped support 18 under elastic preload between boundary 5 and interior panel 11. The large contact surfaces of boundary 5 and interior panel 11 against mounting structure 4 provide particularly accurate spatial orientation of the groove with respect to its seal with boundary 5.

A further exemplary embodiment of a mounting structure 4 is shown in FIG. 5. In contrast to the embodiment of FIG. 4, here, foam element 1 lies flat against interior panel 11 along only a portion 19 of its extension. Foam element 1 is supported on boundary 5 with a sealing lip 10. In addition to its planar support 19 on interior panel 11, the mounting structure is provided with an auxiliary seal 20 that is arranged adjacent to and at a distance from the region in planar contact. This further prevents environmental contaminants from penetrating into the cavity between interior panel 11 and foam element 1.

What is claimed is:

1. A panel element for providing insulation against acoustic vibrations in a hollow body that has an opening on at least one side, comprising:

a closed-cell foam panel element having a shape that corresponds to the shape of a hollow body opening so as to close off the opening when fitted thereto; and a mounting structure located along the periphery of the foam panel element to facilitate attachment of the panel element to the hollow body, said mounting structure facing the perimeter of the opening and comprising a self-contained peripheral groove that is open in the direction of the perimeter of the opening, whereby the groove and the perimeter can be brought into engagement with one another in a sealing and positive manner.

2. A panel element according to claim 1, wherein the groove comprises a pair of facing delimiting surfaces such that the groove has a substantially U-shaped profile, and at least one of the facing delimiting surfaces has at least one sealing lip which sealingly surrounds the opening of the hollow body.

3. A panel element according to claim 1, further comprising in interior component of a motor vehicle, and wherein the foam element is joined, on the side facing away from the hollow body, to the interior panel.

4. A panel element according to claim 2, further comprising in interior component of a motor vehicle, and wherein the foam element is joined, on the side facing away from the hollow body, to the interior panel.

5. A panel element according to claim 3, wherein the foam element and the interior panel form a preassembled unit and can be snapped in together into the hollow body.

6. A panel element according to claim 3, wherein the foam element and the interior panel are arranged to face each other at a spaced apart distance from one another; and the foam element further comprises integrally shaped-on spacers that lie in contact with the interior panel under elastic preload.

7. A panel element according to claim 5, wherein the foam element and the interior panel are arranged to face each other at a spaced apart distance from one another; and the foam element further comprises integrally shaped-on spacers that lie in contact with the interior panel under elastic preload.

8. A panel element according to claim 6, wherein the spacers are cup-shaped to constitute Helmholz resonators; and said Helmholz resonators that are adjacent to one another enclose different volumes and are provided with orifices differing in size from one to the adjacent other.

9. A panel element according to claim 7, wherein the spacers are cup-shaped to constitute Helmholz resonators; and said Helmholz resonators that are adjacent to one another enclose different volumes and are provided with orifices differing in size from one to the adjacent other.

10. A panel element according to claim 9, wherein the panel further comprises a film for preventing moisture from leaking past the orifices in the Helmholz resonators.

11. A panel element according to claim 2, further comprising a door panel and wherein the foam panel element has a flat portion along its periphery for contacting the door panel.

12. A panel element according to claim 2, wherein the foam panel element has an elastically deformable dovetail-shaped periphery for fitting the foam panel to a separate panel element.

* * * * *